US012810384B2

(12) United States Patent
Tsai

(10) Patent No.: US 12,810,384 B2
(45) Date of Patent: Nov. 24, 2026

(54) IMAGE STITCHING METHOD AND IMAGE STITCHING SYSTEM CAPABLE OF IDENTIFYING A BASE PLANE

(71) Applicant: Huper Laboratories Co., Ltd., Taipei City (TW)

(72) Inventor: Chih-Hsiang Tsai, Taichung City (TW)

(73) Assignee: Huper Laboratories Co., Ltd., Taipei City (TW)

( * ) Notice: Subject to any disclaimer, the term of this patent is extended or adjusted under 35 U.S.C. 154(b) by 184 days.

(21) Appl. No.: 19/035,963

(22) Filed: Jan. 24, 2025

(65) Prior Publication Data

US 2026/0148336 A1 May 28, 2026

(30) Foreign Application Priority Data

Nov. 22, 2024 (TW) ................................ 113145030

(51) Int. Cl.
*G06T 3/4038* (2024.01)
*G06T 7/10* (2017.01)

(52) U.S. Cl.
CPC ............. *G06T 3/4038* (2013.01); *G06T 7/10* (2017.01); *G06T 2207/20021* (2013.01); *G06T 2207/20024* (2013.01)

(58) Field of Classification Search
CPC ......... G06T 3/4038; G06T 2207/20221; G06T 2207/30244; G06T 2207/10028; G06T 7/73; G06T 7/33; G06T 2207/10016; G06T 17/00; G06T 5/50; G06T 7/74; G06T 2207/20084; G06T 7/337; G06T 2200/32; G06T 2207/10024; G06T 7/55; G06T 2207/30252; G06T 11/60; G06T 19/006; G06T 2207/10021; G06T 7/11; G06T 17/05; G06T 2207/20021;
(Continued)

(56) References Cited

U.S. PATENT DOCUMENTS 10,255,670 B1 * 4/2019 Wu ........................ H04N 7/183
2004/0252870 A1 * 12/2004 Reeves .................. G06T 12/30 382/128
(Continued)

FOREIGN PATENT DOCUMENTS

| | | |
|---|---|---|
| CN | 106875374 A | 6/2017 |
| TW | 201813368 A | 4/2018 |
| TW | 201841140 A | 11/2018 |

*Primary Examiner* — Alex S Liew
(74) *Attorney, Agent, or Firm* — Winston Hsu

(57) ABSTRACT

An image stitching method includes partitioning an image captured by a camera into a plurality of image blocks, partitioning each image block of the plurality of image blocks into a ground image area and a non-ground image area, performing a first filtering process on the each image block based on the plane angle corresponding to the each image block, performing a second filtering process on an image block based on a ground pixel proportion threshold if the image block passes the first filtering process, labeling a plurality of pixels corresponding to the ground image area in the image block as a ground detection area if the image block passes the second filtering process, and acquiring a plurality of ground detection areas for stitching a plurality of three-dimensional spatial images captured by a plurality of cameras based on the plurality of ground detection areas.

20 Claims, 6 Drawing Sheets

(58) Field of Classification Search
CPC . G06T 2207/30004; G06T 3/18; G06T 19/00; G06T 2207/20081; G06T 2219/024; G06T 7/194; G06T 5/80; G06T 7/0002; G06V 10/16; G06V 10/462; G06V 20/20; G06V 20/58; G06V 10/82; G06V 20/56; G06V 10/24; G06V 10/50; G06V 10/25; G06V 10/443; G06V 10/75; G06V 10/147; G06V 10/60
See application file for complete search history.

(56) References Cited

U.S. PATENT DOCUMENTS

| | | | | |
|---|---|---|---|---|
| 2012/0154586 | A1* | 6/2012 | Chung | H04N 17/002<br>348/148 |
| 2016/0088287 | A1 | 3/2016 | Sadi | |
| 2019/0156145 | A1* | 5/2019 | Pourian | G06F 18/22 |

* cited by examiner

IMAGE STITCHING METHOD AND IMAGE STITCHING SYSTEM CAPABLE OF IDENTIFYING A BASE PLANE

BACKGROUND OF THE INVENTION

1. Field of the Invention

The present invention illustrates an image stitching method and an image stitching system, and more particularly, an image stitching method and an image stitching system capable of identifying a base plane used for image stitching.

2. Description of the Prior Art

With the development of stereo camera technology, its applications are becoming more and more widespread, such as: depth detection, spatial modeling, human-computer interaction, etc. The detection range of a general stereo camera is limited. Therefore, if the detection range is to be expanded, it is necessary to rely on the stitching of a plurality of stereo detection spaces constructed by a plurality of stereo cameras. Generally speaking, a stereo camera can obtain the parallax value (disparity) of an object to obtain three-dimensional information of the object, including depth information. The stereo camera may include two lenses for photographing the same scene from different angles through the two lenses, and then calculating the depth using the triangulation principle. Moreover, the stereo camera can obtain the three-dimensional information of the target object by corresponding points on the imaging planes of the two lenses.

However, in performing image stitching, a common plane needs to be selected between the images so that after the plurality of images are stitched, a common coordinate space can be obtained. The common plane can be regarded as a base plane. Therefore, developing an image stitching system capable of identifying a common plane (such as a ground plane) used for image stitching to facilitate image stitching technology is an important design issue.

SUMMARY OF THE INVENTION

In an embodiment of the present invention, an image stitching method is disclosed. The image stitching method comprises acquiring installation information of a camera and calculating a first plane equation corresponding to a reference ground based on the installation information, partitioning an image captured by the camera into a plurality of image blocks, partitioning each image block of the plurality of image blocks into a ground image area and a non-ground image area based on the first plane equation and three-dimensional spatial information of each pixel of the image, generating a second plane equation corresponding to a ground image for each image block based on the ground image area, generating a plane angle between the ground image of each image block and the reference ground based on the first plane equation and the second plane equation, performing a first filtering process on each image block based on the plane angle corresponding to each image block, performing a second filtering process on an image block based on a ground pixel proportion threshold if the image block passes the first filtering process, labeling a plurality of pixels corresponding to the ground image area in the image block as a ground detection area if the image block passes the second filtering process, and acquiring a plurality of ground detection areas for stitching a plurality of three-dimensional spatial images captured by a plurality of cameras based on the plurality of ground detection areas.

In another embodiment of the present invention, an image stitching system is disclosed. The image stitching system comprises a camera configured to capture an image, and a processor coupled to the camera and configured to process the image. The processor acquires installation information of the camera and calculates a first plane equation corresponding to a reference ground based on the installation information. The processor partitions the image into a plurality of image blocks. The processor partitions each image block of the plurality of image blocks into a ground image area and a non-ground image area based on the first plane equation and three-dimensional spatial information of each pixel of the image. The processor generates a second plane equation corresponding to a ground image for each image block based on the ground image area. The processor generates a plane angle between the ground image of each image block and the reference ground based on the first plane equation and the second plane equation. The processor performs a first filtering process on each image block based on the plane angle corresponding to each image block. The processor performs a second filtering process on an image block based on a ground pixel proportion threshold if the image block passes the first filtering process. The processor labels a plurality of pixels corresponding to the ground image area in the image block as a ground detection area if the image block passes the second filtering process. The processor acquires a plurality of ground detection areas for stitching a plurality of three-dimensional spatial images based on the plurality of ground detection areas.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
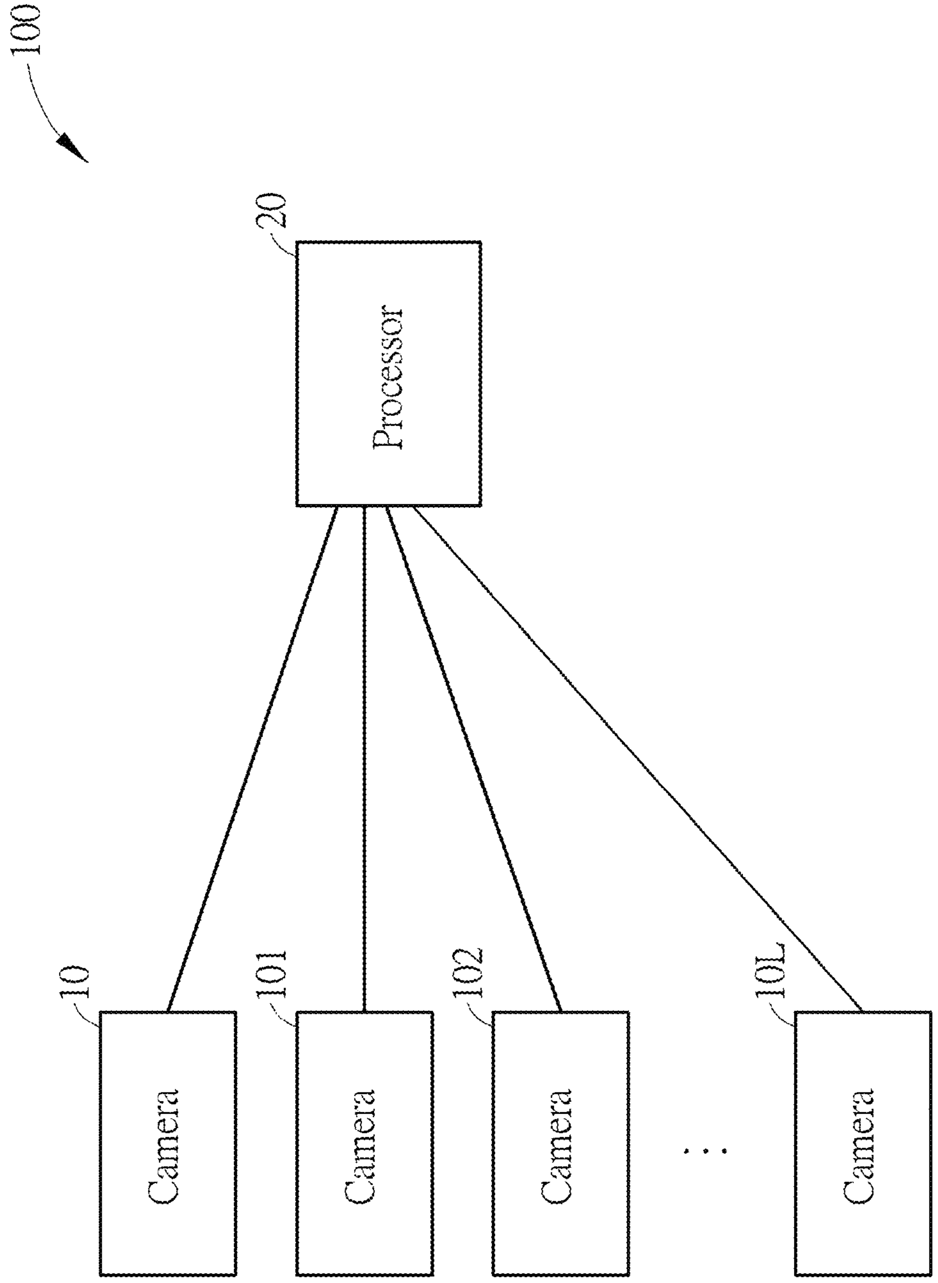
FIG. 1 is a block diagram of an image stitching system according to an embodiment of the present invention.

FIG. 1 is a block diagram of an image stitching system 100 according to an embodiment of the present invention. The image stitching system 100 includes a camera 10 and a processor 20. The camera 10 may be a three-dimensional image camera or a stereo camera used for capturing an image, which is capable of obtaining the three-dimensional information of an object by disparity values of the object.

The processor 20 is coupled to the camera 10 for processing images. The processor 20 may be a computer, a server, or a workstation. The image stitching system 100 can identify a base plane (such as a ground plane) used for image stitching based on the images captured by the camera 10. However, it should be understood that the image stitching system 100 may further include a plurality of cameras 101 to 10L. The plurality of cameras 101 to 10L are coupled to the processor 20. They are used for providing a plurality of images. In other words, the image stitching system 100 can stitch images captured by the plurality of cameras 10 and 101 to 10L based on the base plane. L is a positive integer. Operations of the image stitching system 100 are briefly described as follows. First, the processor 20 acquires installation information of the camera 10 and calculates a first plane equation corresponding to a reference ground based on the installation information. Then, the processor 20 partitions an image into a plurality of image blocks. The processor 20 partitions each image block of the plurality of image blocks into a ground image area and a non-ground image area based on the first plane equation and the three-dimensional spatial information of each pixel of the image. The processor 20 generates a second plane equation corresponding to a ground image for each image block based on the ground image area. The processor 20 generates a plane angle between the ground image of each image block and the reference ground based on the first plane equation and the second plane equation. The processor 20 performs a first filtering process on each image block based on the plane angle corresponding to each image block. If an image block passes the first filtering process, the processor 20 performs a second filtering process on the image block based on a ground pixel proportion threshold. If the image block passes the second filtering process, the processor 20 labels a plurality of pixels corresponding to the ground image area in the image block as a ground detection area. The processor 20 acquires a plurality of ground detection areas for stitching a plurality of three-dimensional spatial images based on the plurality of ground detection areas. Thus, the image stitching system 100 can be regarded as a system using the information of the two-dimensional images for stitching the plurality of three-dimensional spatial images. Details of the operation of the image stitching system 100 are described below.

Figure 2:
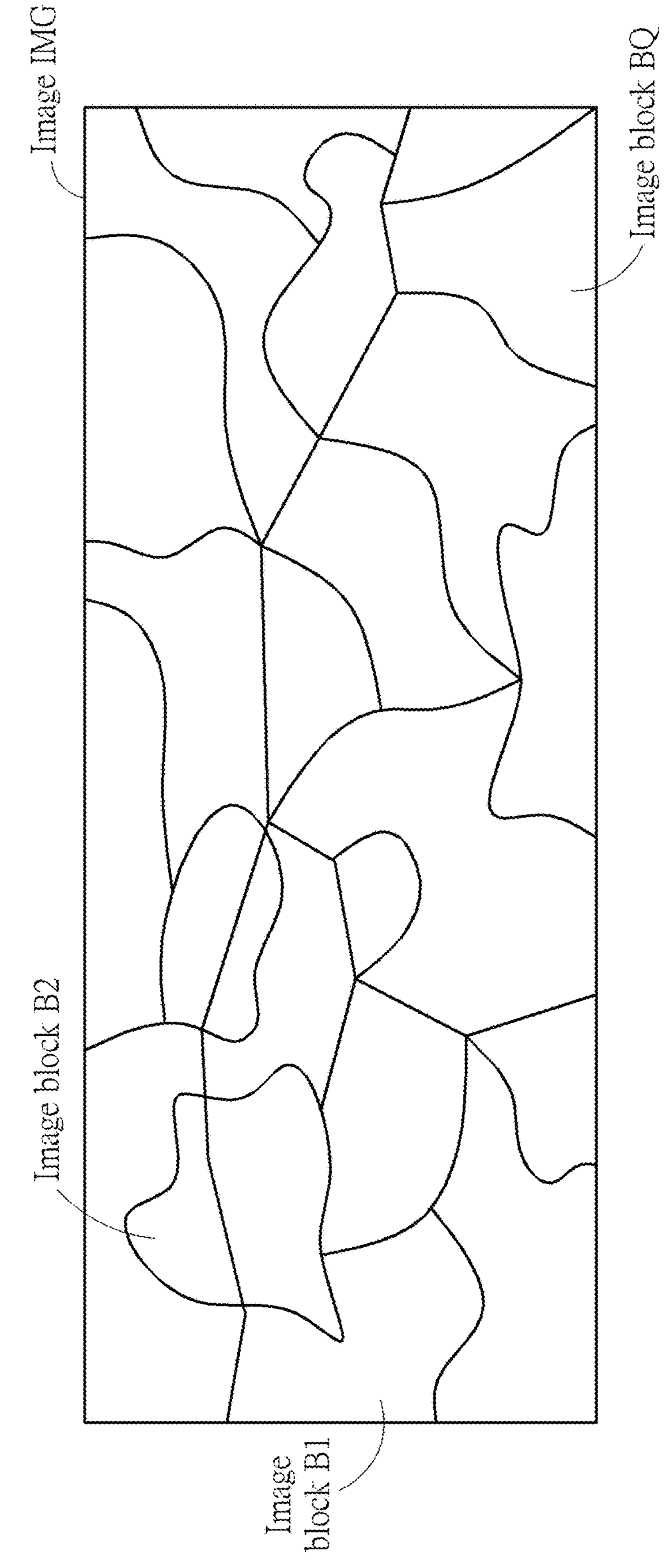
FIG. 2 is a schematic diagram of partitioning an image into a plurality of image blocks in the image stitching system in FIG. 1.

FIG. 2 is a schematic diagram of partitioning the image IMG into a plurality of image blocks B1 to BQ in the image stitching system 100. As mentioned above, in the image stitching system 100, each camera has specific installation information. This includes details such as the installation angle of camera 10, its height from the ground, the rotation angle of the camera lens, and other relevant parameters. Since the installation information of the camera 10 is based on the ground as a reference, the processor 20 can obtain a first plane equation corresponding to the reference ground based on the installation information of the camera 10. Then, as shown in FIG. 2, the processor 20 can acquire image characteristic data of a plurality of pixels in the image IMG. For example, the processor 20 may acquire color data, gradient data, and gray scale data of each pixel in the image IMG. The processor 20 can partition the image IMG into the plurality of image blocks B1 to BQ based on the image characteristic data. Q is a positive integer. In one embodiment, the plurality of pixels in the same image block have similar image characteristics. For example, pixels with similar colors or brightness may be classified as the same image block. The plurality of image blocks B1 to BQ may be different in size, shape, and position. It should be understood that the image stitching system 100 can also dynamically allocate the image blocks B1 to BQ based on the complexity of the region in the image IMG. For example, if the color or structure of a certain region in the image IMG is relatively monotonous, the image stitching system 100 can allocate fewer image blocks to that region. If the color or structure of a certain region in the image IMG is relatively complex, the image stitching system 100 can allocate more image blocks to that region. Any reasonable technical modification falls into the scope of the embodiments.

Figure 3:
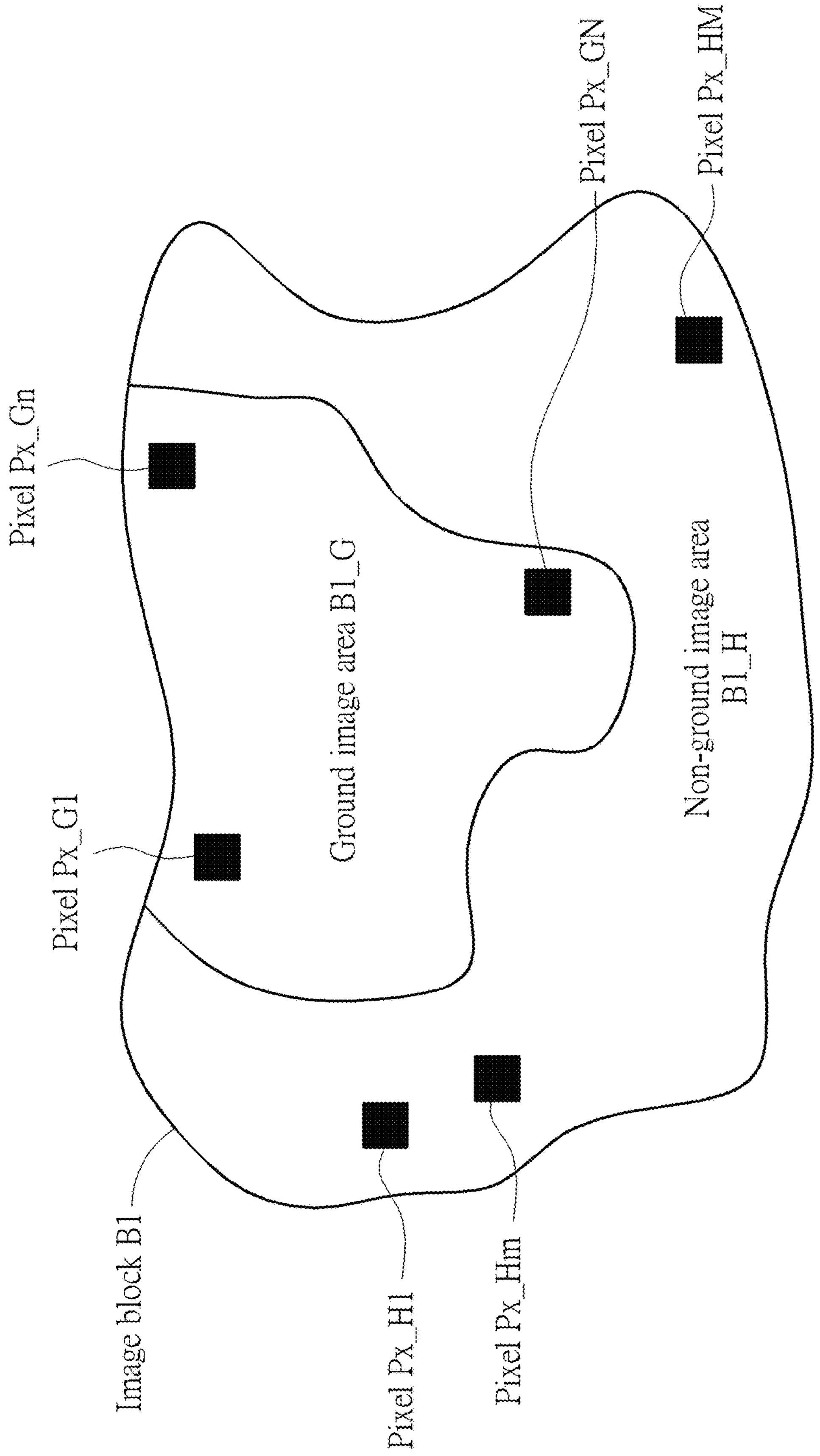
FIG. 3 is a schematic diagram of classifying pixels in an image block into a ground image area and a non-ground image area of the image stitching system in FIG. 1.

FIG. 3 is a schematic diagram of classifying pixels in an image block into the ground image area B1_G and the non-ground image area B1_H by the processor 20 of the image stitching system 100. As mentioned above, the processor 20 can classify the pixels in each image block into the ground image area and the non-ground image area after the image IMG is partitioned into a plurality of image blocks B1 to BQ. For illustration simplicity, the image block B1 is described as an example. The processor 20 can generate a distance between each pixel in the image block B1 and the reference ground in a three-dimensional space based on the first plane equation and the three-dimensional spatial information of each pixel in the image block B1. It should be understood that the camera 10 can be a three-dimensional image camera. Therefore, the processor 20 can find the same feature points in two two-dimensional images captured by two lenses of the camera 10. The two feature points are the same spatial point in a real world space, but they have different positions in two two-dimensional images due to the parallax. Then, the processor 20 can calculate a distance (i.e., depth information) between the spatial point and the camera 10 by using triangulation based on a distance between two lenses (i.e., called a distance of a baseline) and the parallax of the spatial point in two two-dimensional images. After the processor 20 acquires the depth information of each pixel in the image block B1, the processor 20 can calculate the distance between each pixel and the reference ground based on the first plane equation. For example, the distance between the pixel Px_G1 and the reference ground is PDG1. The distance between the pixel Px_Gn and the reference ground is PDGn. The distance between the pixel Px_GN and the reference ground is PDGN. The distance between the pixel Px_H1 and the reference ground is PDH1. The distance between the pixel Px_Hm and the reference ground is PDHm. The distance between the pixel Px_HM and the reference ground is PDHM.

Then, the processor 20 can classify a portion of pixels of each image block having distances to the reference ground being less than or equal to a distance threshold as the ground image area. The processor 20 can classify another portion of pixels of each image block having distances to the reference ground being greater than the distance threshold as the non-ground image area. For example, the processor 20 sets a distance threshold DTH. In the image block B1, if the distances PDG1, PDGn to PDGN are less than or equal to the distance threshold DTH (i.e., PDG1, PDGn to PDGN≤DTH), it indicates that the pixels Px_G1, Px_Gn to Px_GN may correspond to the ground image. Therefore, the pixels Px_G1, Px_Gn to Px_GN can be classified into the ground image area B1_G by the processor 20. In the image block B1, if the distances PDH1, PDHm to PDHM are greater than the distance threshold DTH (i.e., PDH1, PDHm to PDHM>DTH), it indicates that the pixels Px_H1, Px_Hm to Px_HM may correspond to the non-ground image. Therefore, the pixels Px_H1, Px_Hm to Px_HM can be classified into the non-ground image area B1_H by the processor 20. Therefore, in FIG. 3, it is assumed that the image block B1 includes (M+N) pixels. In the image block B1, N pixels are classified into the ground image area B1_G. M pixels are classified into the non-ground image area B1_H. N and M are positive integers.

Then, the processor 20 can generate a second plane equation corresponding to the ground image for each image block based on the ground image area of each image block. For example, for the image block B1, the processor 20 can generate a second plane equation corresponding to the ground image for the image block B1 by using the three-dimensional spatial information (for example, depth information) of the N pixels classified in the ground image area B1_G. The first plane equation is generated based on the installation information of camera 20, so the first plane equation can be regarded as a reference function corresponding to the real ground. The second plane equation is generated based on the estimation using N pixels that are classified in the ground image area B1_G, so the second plane equation can be regarded as a function corresponding to the estimated ground. The processor 20 can calculate the plane angle between the first plane equation and the second plane equation, which is equivalent to the plane angle between the "estimated" ground of the image block B1 and the reference ground. The processor 20 can set an angle threshold. If the plane angle corresponding to an image block is less than or equal to the angle threshold, the processor 20 retains the image block. If the plane angle corresponding to an image block is greater than the angle threshold, the processor 20 eliminates the image block. For example, if the plane angle between the estimated ground of image block B1 and the reference ground is less than or equal to the angle threshold, classifying the N pixels Px_G1, Px_Gn to Px_GN in the ground image area B1_G achieves a certain accuracy. Therefore, the processor 20 can retain the image block B1. If the plane angle between the classified ground image of image block B1 and the reference ground is greater than the angle threshold, classifying the N pixels Px_G1, Px_Gn to Px_GN in the ground image area B1_G lacks sufficient accuracy. Therefore, the processor 20 can eliminate the image block B1.

Next, if the image block B1 passes the filtering process of the aforementioned steps, the processor 20 can set a ground pixel proportion threshold for the second filtering process on the image block B1. Details are described as follows. If, among Q image blocks B1 to BQ, P image blocks are retained based on the aforementioned condition of the angle threshold, the processor 20 can calculate P ground pixel proportions r1 to rP corresponding to the P image blocks. The ground pixel proportion of the image block can be defined as a quantity ratio of a plurality of pixels corresponding to the ground image area in the image block to all pixels in the image block. For example, the ground pixel proportion r1 of the image block B1 can be defined as a quantity ratio of the pixels classified in the ground image area B1_G (i.e., a total of N pixels from Px_G1 to Px_GN) to all pixels (i.e., a total of M+N pixels) of the image block B1, which can be expressed as $r1=(N/(M+N))$. The ground pixel proportions r2 to rP of the image block B2 to the image block BP are generated in a similar method, so the details thereof will not be repeated here. Next, the processor 20 can generate an average and a standard deviation of the P ground pixel proportions r1 to rP based on the P ground pixel proportions r1 to rP. After that, the processor 20 can generate a ground pixel proportion threshold rTH based on the average and the standard deviation. The processor 20 can perform a second filtering process on the remaining P image blocks from the first filtering process based on the ground pixel proportion threshold rTH. In one embodiment, for the image block B1, if the ground pixel proportion $r1=(N/(M+N))$ is less than or equal to the ground pixel proportion threshold (i.e., $r1 \leq rTH$), the processor 20 can eliminate the image block B1. In another embodiment, for the image block B1, if the ground pixel proportion $r1=(N/(M+N))$ is greater than the ground pixel proportion threshold (i.e., $r1>rTH$), the processor 20 can retain the image block B1. The rationale for using the ground pixel proportion threshold rTH to perform the second filtering process on the image block in the image stitching system 100 is explained as follows. Since the image stitching system 100 can perform image processing on spaces of various scenes, in order to adapt to scenes with different complexities, the image blocks with "a relatively low number of pixels corresponding to the ground image area" can be filtered based on the ground pixel proportion threshold rTH. As a result, the image blocks that eventually pass the second filtering process will have a relatively high ground pixel proportion, thereby increasing the reliability of determining the ground detection area.

In other words, in the image stitching system 100, after the image IMG is partitioned into a plurality of image blocks B1 to BQ, each image block is processed by two filtering processes in order to determine the image block that contains the "ground image". If an image block (such as the image block B1) is retained, it indicates that the pixels contained in the image block B1 and belonging to the ground image area B1_G are highly referential. Therefore, the processor 20 can label the pixels corresponding to the ground image area B1_G in the image block B1 as a ground detection area.

Figure 4:
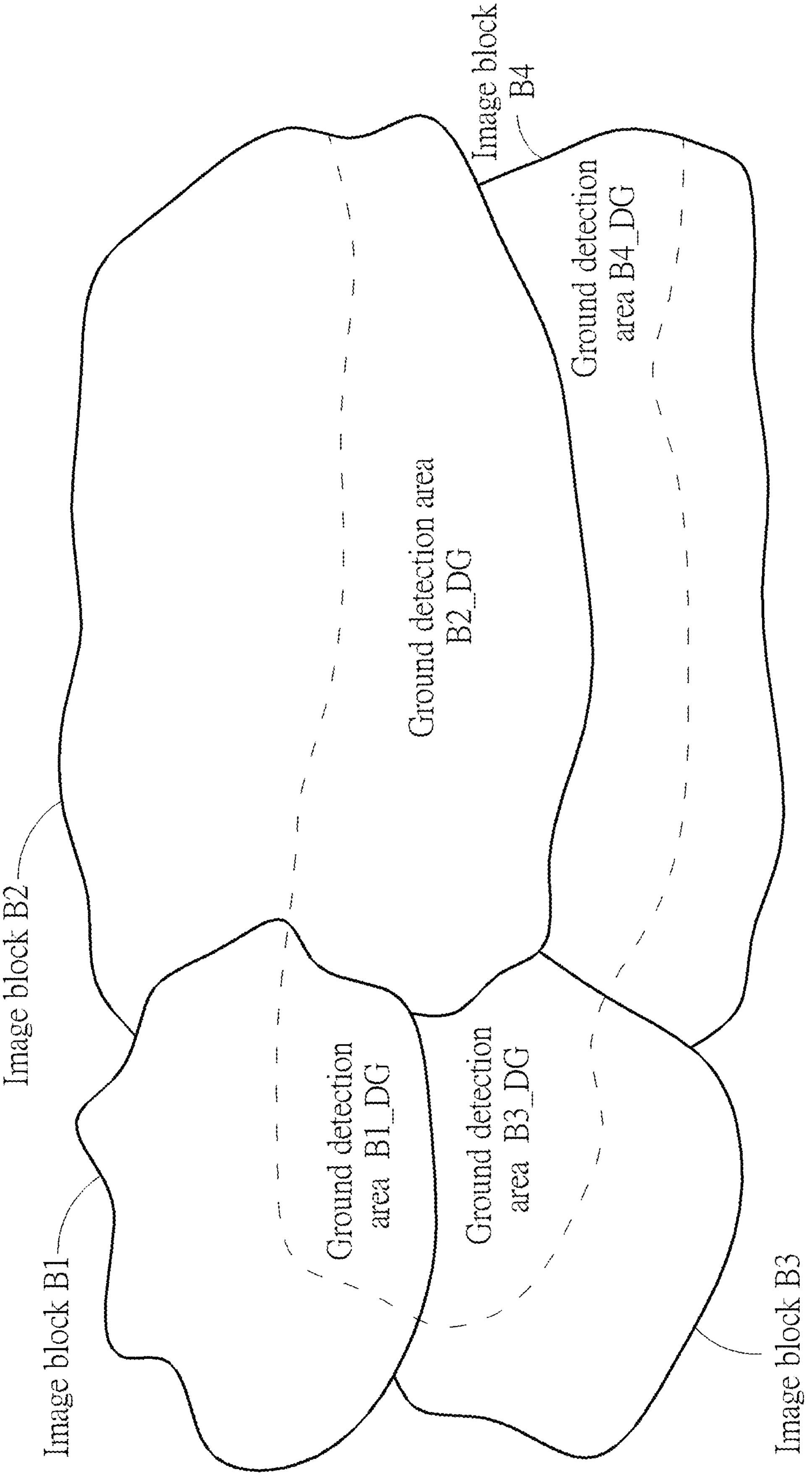
FIG. 4 is a schematic diagram of determining a ground detection area in the image block of the image stitching system in FIG. 1.

FIG. 4 is a schematic diagram of determining the ground detection area in the image block of the image stitching system 100. As shown in FIG. 4, if the image blocks B1 to B4 are retained after being filtered twice, it indicates that the image blocks B1 to B4 include a plurality of pixels corresponding to the ground image area that is highly referential. Therefore, the processor 20 can label a plurality of pixels corresponding to the ground image area in the image block B1 as a ground detection area B1_DG. The processor 20 can label a plurality of pixels corresponding to the ground image area in the image block B2 as a ground detection area B2_DG. The processor 20 can label a plurality of pixels corresponding to the ground image area in the image block B3 as a ground detection area B3_DG. The processor 20 can label a plurality of pixels corresponding to the ground image area in the image block B4 as a ground detection area B4_DG. When the processor 20 labels all the pixels corresponding to the ground detection areas in the image IMG, these ground detection areas can form a ground detection image, which can be regarded as a base ground used for image stitching. For example, the ground detection area B1_DG, the ground detection area B2_DG, the ground detection area B3_DG, and the ground detection area B4_DG of the image blocks B1 to B4 can form the ground detection image.

Figure 5:
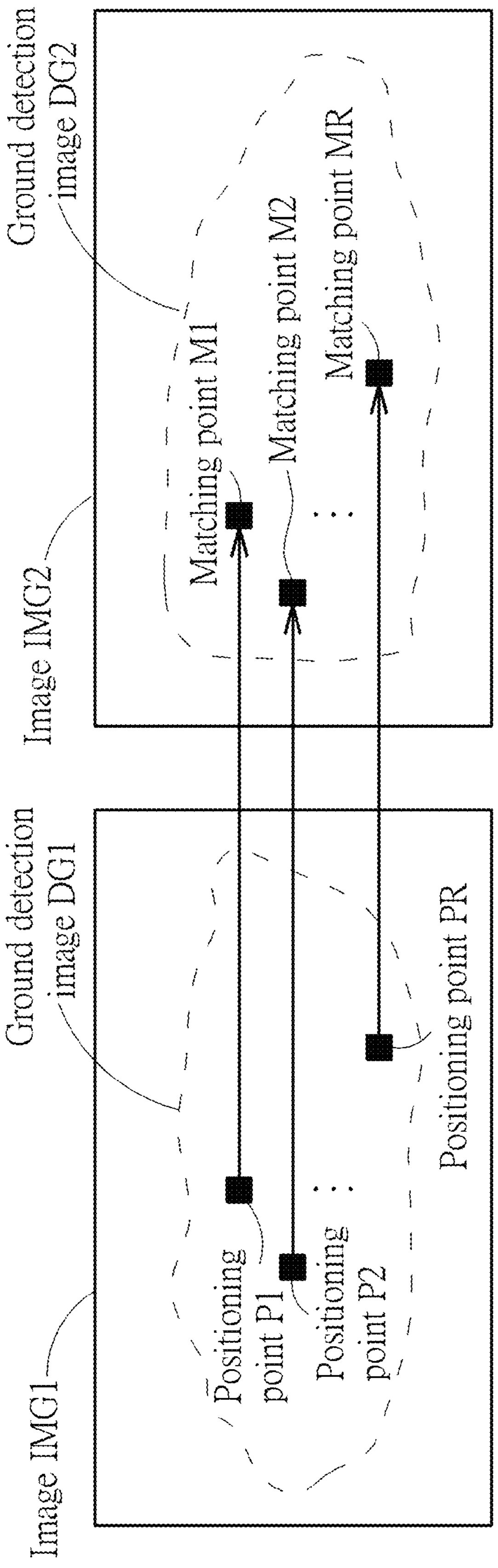
FIG. 5 is a schematic diagram of determining a plurality of positioning points and a plurality of matching points based on ground detection images of the image stitching system in FIG. 1.

FIG. 5 is a schematic diagram of determining a plurality of positioning points P1 to PR and a plurality of matching points M1 to MR based on ground detection images DG1 and DG2 of the image stitching system 100. As mentioned above, after the processor 20 acquires a plurality of ground detection areas, it can determine the ground detection image in the image as the base ground used for image stitching. As shown in FIG. 5, the image IMG1 includes the ground detection image DG1. The image IMG2 includes the ground detection image DG2. For the image IMG1, the processor 20 can limit the detection range in the ground detection image DG1 to determine a plurality of positioning points P1 to PR and feature description information of the plurality of positioning points P1 to PR. For example, edge information or corner information of the positioning points P1 to PR can be determined. R is a positive integer greater than or equal to 8. Then, the processor 20 can search matching points in other images by using the Random Sample Consensus (RANSAC) algorithm, together with the Homography Matrix. The RANSAC algorithm is an iterative method used for estimating parameters of a mathematical model from a set of observed data that contains outliers. In other words, it can be used for eliminating unmatched pixels in a group of pixel sets and finding suitable matched pixels. In FIG. 5, the positioning point P1 of the image IMG1 corresponds to the matching point M1 of the image IMG2. The positioning point P2 of the image IMG1 corresponds to the matching point M2 of the image IMG2. The positioning point PR of the image IMG1 corresponds to the matching point MR of the image IMG2. It should be understood that, as mentioned above, the image stitching system 100 may further include cameras 101 to 10L. The cameras 10 and 101 to 10L may have different installation information. For example, the cameras 10 and 101 to 10L have different installation heights, varying lens focal lengths, different baseline lengths, and other distinct parameters. Therefore, the processor 20 can perform a top view conversion on the three-dimensional spatial images detected by these cameras 10 and 101 to 10L based on the ground detection image DG1 and the installation information of the cameras 10 and 101 to 10L to update the three-dimensional spatial images. In other words, the processor 20 can select a common plane (such as the ground detection image DG1) corresponding to the three-dimensional spatial images captured by the cameras 10 and 101 to 10L. Then, the processor 20 can project the three-dimensional spatial images onto the common plane so that the three-dimensional spatial images have the same depression angle after the top view conversion is performed. Since the positioning points P1 to PR and the matching points M1 to MR can be regarded as reference points for performing image stitching of three-dimensional spatial images. Therefore, the processor 20 can stitch the three-dimensional spatial images based on the positioning points P1 to PR and the matching points M1 to MR, effectively stitching a plurality of top view spaces.

Figure 6:
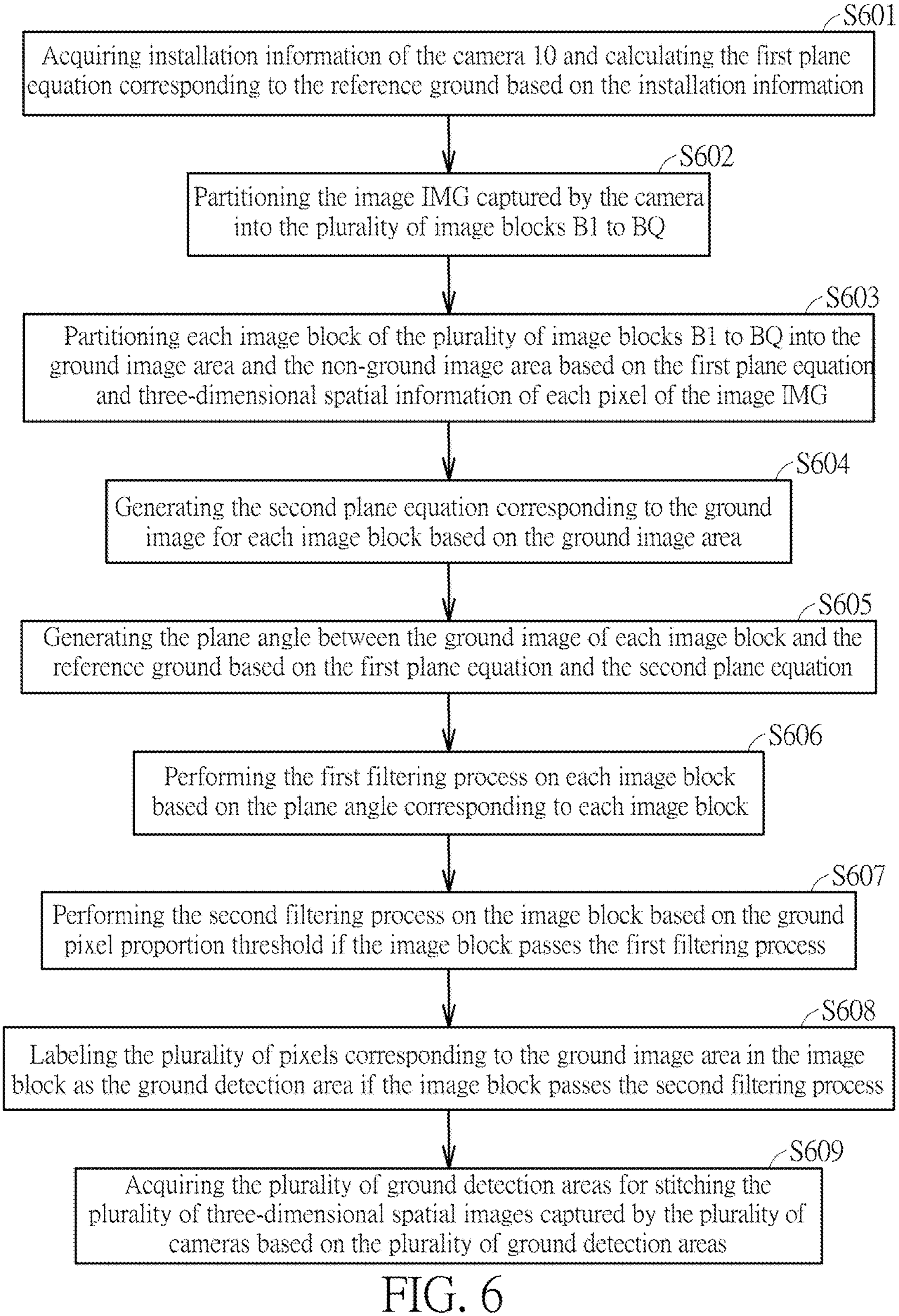
FIG. 6 is a flowchart of performing an image stitching method by the image stitching system in FIG. 1.

FIG. 6 is a flowchart of performing an image stitching method by the image stitching system 100. The image stitching method includes steps S601 to S609. Any reasonable technical or hardware modification falls into the scope of the embodiments. Steps S601 to S609 are described as follows.

- Step S601: acquiring installation information of the camera 10 and calculating the first plane equation corresponding to the reference ground based on the installation information;
- Step S602: partitioning the image IMG captured by the camera into the plurality of image blocks B1 to BQ;
- Step S603: partitioning each image block of the plurality of image blocks B1 to BQ into the ground image area and the non-ground image area based on the first plane equation and three-dimensional spatial information of each pixel of the image IMG;
- Step S604: generating the second plane equation corresponding to the ground image for each image block based on the ground image area;

- Step S605: generating the plane angle between the ground image of each image block and the reference ground based on the first plane equation and the second plane equation;
- Step S606: performing the first filtering process on each image block based on the plane angle corresponding to each image block;
- Step S607: performing the second filtering process on the image block based on the ground pixel proportion threshold if the image block passes the first filtering process;
- Step S608: labeling the plurality of pixels corresponding to the ground image area in the image block as the ground detection area if the image block passes the second filtering process;
- Step S609: acquiring the plurality of ground detection areas for stitching the plurality of three-dimensional spatial images captured by the plurality of cameras based on the plurality of ground detection areas.

Details of steps S601 to S609 are previously illustrated. Thus, they are omitted here. In the image stitching system 100, after the image IMG is partitioned into the plurality of image blocks B1 to BQ, each image block is processed by two filtering processes, including filtering based on the plane angle between a portion of the image block and the reference ground, and filtering based on the ground pixel proportion threshold. The processor 20 can determine the image block that contains the “ground image”. If an image block is retained, it indicates that the plurality of pixels contained in the image block and belonging to the ground image area are highly referential. Therefore, in subsequent image stitching processes, since a plurality of pixels corresponding to the ground image area can be formed as the base plane, the accuracy of image stitching can also be increased.

In summary, the aforementioned embodiments disclose an image stitching method and an image stitching system. By partitioning an image into a plurality of image blocks and detecting pixels belonging to a ground image area and pixels belonging to a non-ground image area in each image block, the embodiments can determine whether the image block contains ground information. The processor can filter the image blocks twice based on the plane angle between the image block and a reference ground and a ground pixel proportion threshold of the image block to determine the image block containing the “ground image.” Then, the processor can label the pixels in the ground image area as a ground detection area, thereby increasing the accuracy of image stitching. Compared with conventional image stitching methods, the image stitching method of the embodiments is capable of dynamically determining the quantity of image blocks and the size of each image block based on the installation information of the camera, thereby increasing the accuracy of ground detection. Moreover, since the image stitching method and system of the embodiments can filter the image blocks based on the plane angle between the image block and the reference ground and the ground pixel proportion threshold, the embodiments can further increase the accuracy of ground detection, thereby increasing the accuracy of image stitching.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image stitching method comprising:

acquiring installation information of a camera and calculating a first plane equation corresponding to a reference ground based on the installation information;

partitioning an image captured by the camera into a plurality of image blocks;

partitioning each image block of the plurality of image blocks into a ground image area and a non-ground image area based on the first plane equation and three-dimensional spatial information of each pixel of the image;

generating a second plane equation corresponding to a ground image for the each image block based on the ground image area;

generating a plane angle between the ground image of the each image block and the reference ground based on the first plane equation and the second plane equation;

performing a first filtering process on the each image block based on the plane angle corresponding to the each image block;

performing a second filtering process on an image block based on a ground pixel proportion threshold if the image block passes the first filtering process;

labeling a plurality of pixels corresponding to the ground image area in the image block as a ground detection area if the image block passes the second filtering process; and acquiring a plurality of ground detection areas for stitching a plurality of three-dimensional spatial images captured by a plurality of cameras based on the plurality of ground detection areas.

2. The method of claim 1, wherein partitioning the each image block of the plurality of image blocks into the ground image area and the non-ground image area based on the first plane equation and the three-dimensional spatial information of the each pixel of the image comprises:

generating a distance between the each pixel and the reference ground in a three-dimensional space based on the first plane equation and the three-dimensional spatial information of the each pixel of the image;

classifying a portion of pixels of the each image block having distances to the reference ground being less than or equal to a distance threshold as the ground image area; and classifying another portion of pixels of the each image block having distances to the reference ground being greater than the distance threshold as the non-ground image area.

3. The method of claim 1, wherein performing the first filtering process on the each image block based on the plane angle corresponding to the each image block comprises:

setting an angle threshold; and retaining the image block if the plane angle corresponding to the image block is less than or equal to the angle threshold.

4. The method of claim 1, wherein performing the first filtering process on the each image block based on the plane angle corresponding to the each image block comprises:

setting an angle threshold; and eliminating the image block if the plane angle corresponding to the image block is greater than the angle threshold.

5. The method of claim 1, wherein performing the second filtering process on the image block based on the ground pixel proportion threshold if the image block passes the first filtering process comprises:

acquiring a ground pixel proportion of the image block if the image block passes the first filtering process, wherein the ground pixel proportion is a quantity ratio of a plurality of pixels corresponding to the ground image area in the image block to all pixels in the image block;

acquiring an average and a standard deviation of the ground pixel proportion;

setting the ground pixel proportion threshold based on the average and the standard deviation; and eliminating the image block if the ground pixel proportion of the image block is less than or equal to the ground pixel proportion threshold.

6. The method of claim 1, wherein performing the second filtering process on the image block based on the ground pixel proportion threshold if the image block passes the first filtering process comprises:

acquiring a ground pixel proportion of the image block if the image block passes the first filtering process, wherein the ground pixel proportion is a quantity ratio of a plurality of pixels corresponding to the ground image area in the image block to all pixels in the image block;

acquiring an average and a standard deviation of the ground pixel proportion;

setting the ground pixel proportion threshold based on the average and the standard deviation; and retaining the image block if the ground pixel proportion of the image block is greater than the ground pixel proportion threshold.

7. The method of claim 1, wherein partitioning the image captured by the camera into the plurality of image blocks comprises:

acquiring image characteristic data of a plurality of pixels in the image; and partitioning the image into the plurality of image blocks based on the image characteristic data.

8. The method of claim 1, further comprising:

determining a plurality of positioning points from the plurality of ground detection areas and feature description information of the plurality of positioning points for stitching the plurality of three-dimensional spatial images captured by the plurality of cameras after the plurality of ground detection areas are acquired.

9. The method of claim 1, further comprising:

performing a top view conversion on the plurality of three-dimensional spatial images captured by the plurality of cameras for updating the plurality of three-dimensional spatial images based on the plurality of ground detection areas;

wherein the plurality of three-dimensional spatial images have the same depression angle after the top view conversion is performed.

10. The method of claim 1, wherein the camera is a three-dimensional image camera.

11. An image stitching system comprising:

a camera configured to capture an image; and a processor coupled to the camera and configured to process the image;

wherein the processor acquires installation information of the camera and calculates a first plane equation corresponding to a reference ground based on the installation information, the processor partitions the image into a plurality of image blocks, the processor partitions each image block of the plurality of image blocks into a ground image area and a non-ground image area based on the first plane equation and three-dimensional spatial information of each pixel of the image, the processor generates a second plane equation corresponding to a ground image for the each image block based on the ground image area, the processor generates a plane angle between the ground image of the each image block and the reference ground based on the first plane equation and the second plane equation, the processor performs a first filtering process on the each image block based on the plane angle corresponding to the each image block, the processor performs a second filtering process on an image block based on a ground pixel proportion threshold if the image block passes the first filtering process, the processor labels a plurality of pixels corresponding to the ground image area in the image block as a ground detection area if the image block passes the second filtering process, and the processor acquires a plurality of ground detection areas for stitching a plurality of three-dimensional spatial images based on the plurality of ground detection areas.

12. The system of claim 11, wherein the processor generates a distance between the each pixel and the reference ground in a three-dimensional space based on the first plane equation and the three-dimensional spatial information of the each pixel of the image, the processor classifies a portion of pixels of the each image block having distances to the reference ground being less than or equal to a distance threshold as the ground image area, and the processor classifies another portion of pixels of the each image block having distances to the reference ground being greater than the distance threshold as the non-ground image area.

13. The system of claim 11, wherein the processor sets an angle threshold, and the processor retains the image block if the plane angle corresponding to the image block is less than or equal to the angle threshold.

14. The system of claim 11, wherein the processor sets an angle threshold, and the processor eliminates the image block if the plane angle corresponding to the image block is greater than the angle threshold.

15. The system of claim 11, wherein the processor acquires a ground pixel proportion of the image block if the image block passes the first filtering process, the ground pixel proportion is a quantity ratio of a plurality of pixels corresponding to the ground image area in the image block to all pixels in the image block, the processor acquires an average and a standard deviation of the ground pixel proportion, the processor sets the ground pixel proportion threshold based on the average and the standard deviation, and the processor eliminates the image block if the ground pixel proportion of the image block is less than or equal to the ground pixel proportion threshold.

16. The system of claim 11, wherein the processor acquires a ground pixel proportion of the image block if the image block passes the first filtering process, the ground pixel proportion is a quantity ratio of a plurality of pixels corresponding to the ground image area in the image block to all pixels in the image block, the processor acquires an average and a standard deviation of the ground pixel proportion, the processor sets the ground pixel proportion threshold based on the average and the standard deviation, and the processor retains the image block if the ground pixel proportion of the image block is greater than the ground pixel proportion threshold.

17. The system of claim 11, wherein the processor acquires image characteristic data of a plurality of pixels in the image, and the processor partitions the image into the plurality of image blocks based on the image characteristic data.

18. The system of claim 11, wherein the processor determines a plurality of positioning points from the plurality of ground detection areas and feature description information of the plurality of positioning points for stitching the plurality of three-dimensional spatial images after the plurality of ground detection areas are acquired.

19. The system of claim 11, further comprising:

a plurality of cameras coupled to the processor;

wherein the plurality of three-dimensional spatial images are captured by the plurality of cameras, the processor performs a top view conversion on the plurality of three-dimensional spatial images for updating the plurality of three-dimensional spatial images based on the plurality of ground detection areas, and the plurality of three-dimensional spatial images have the same depression angle after the top view conversion is performed.

20. The system of claim 11, wherein the camera is a three-dimensional image camera.

* * * * *